(12) United States Patent
O'Neill et al.

(10) Patent No.: US 7,717,064 B1
(45) Date of Patent: May 18, 2010

(54) GROUND FEEDER FOR ROUND BALES

(76) Inventors: Edward J. O'Neill, 14533 Sixes Rd., Emmitsburg, MD (US) 21727; Kathryn E. O'Neill, 14533 Sixes Rd., Emmitsburg, MD (US) 21727; Bryan R. Saylor, 9101 Liberty Rd., Frederick, MD (US) 21701

( * ) Notice: Subject to any disclaimer, the term of this patent is extended or adjusted under 35 U.S.C. 154(b) by 243 days.

(21) Appl. No.: 11/226,792

(22) Filed: Sep. 14, 2005

Related U.S. Application Data

(60) Provisional application No. 60/623,138, filed on Oct. 28, 2004.

(51) Int. Cl.
*A01K 1/10* (2006.01)
*A01K 5/00* (2006.01)

(52) U.S. Cl. .......................................... 119/60; 119/58

(58) Field of Classification Search ............... 119/51.01, 119/58, 60, 61, 61.1; 47/32, 32.4, 32.5, 32.7, 47/32.8
See application file for complete search history.

(56) References Cited

U.S. PATENT DOCUMENTS

| | | | |
|---|---|---|---|
| 1,319,060 A | * | 10/1919 | Gardon .......................... 119/60 |
| 2,782,561 A | * | 2/1957 | Smith ........................... 47/21.1 |
| 2,978,837 A | * | 4/1961 | Daniels ........................... 47/32 |
| 4,346,671 A | * | 8/1982 | Wagner ........................ 119/60 |
| 5,337,699 A | * | 8/1994 | Dyson ........................... 119/60 |
| 5,522,345 A | * | 6/1996 | Payne ............................ 119/60 |
| 5,711,106 A | * | 1/1998 | Ellis ............................... 47/32 |
| 6,446,400 B1 | * | 9/2002 | Block et al. ................... 52/102 |

* cited by examiner

*Primary Examiner*—David J Parsley
(74) *Attorney, Agent, or Firm*—Miller Law Group, PLLC

(57) ABSTRACT

A ground feeder ring is provided for use with round bales of hay positioned on the ground in the field for feeding the hay to horses with a minimum of waste. The feeder ring is preferably assembled in the field around a previously positioned round hay bale and is formed from several individual ring segments that, when assembled, define a ring encircling the bale. Each ring segment is formed with corresponding overlap regions at the respective ends thereof with fastener openings formed therein to permit the connection of adjacent ring segments. The assembled ring prevents horses from accessing the bottom portion of the round bale that causes waste of the hay, thus reducing feeding costs. The ring segments can be manufactured from plastic formed during a rotational molding process to provide a durable double wall, lightweight device that can be easily transported and assembled in the field.

13 Claims, 4 Drawing Sheets

GROUND FEEDER FOR ROUND BALES

CROSS-REFERENCE TO RELATED APPLICATIONS

This application claims domestic priority on U.S. Provisional Patent Application Ser. No. 60/623,138, filed Oct. 28, 2004, the contents of which are incorporated herein by reference.

FIELD OF THE INVENTION

The present invention is directed to feeders for use in dispensing hay to animals from round bales as a food source for the animals and, more particularly, to a ground feeder that is suited for utilization with round bales for feeding hay to horses.

BACKGROUND OF THE INVENTION

Round hay bales are typically formed in a cylindrical shape and weigh more than 1000 pounds. As a result, round hay bales are normally transported by tractors or skid steer loaders on spear-like carriers designed to impale the end of the cylindrical bale. Dispensing the hay to the animals is often the process of dropping the round bale on the ground in an open area for access by the animals to be fed. Such a feeding process exposes the hay to contamination from ground moisture, the weather, animal wastes and dirt. Furthermore, the hay can become a marking territory for the dominant horses and bedding material for others. Accordingly, this feeding process generally wastes up to 50% of the hay with respect to being available for feed for the animals. Therefore, feeding animals in the open range or pasture by dropping the round hay bale on the ground increases feeding costs. Furthermore, since a round bale of hay under these conditions is not likely to last for four days for four horses during the winter, increased costs of transporting additional round bales also adds to the cost of feeding hay to the animals.

Most round bale feeders that are commercially available are designed to minimize the waste issues associated with the dropping of the round bale onto the ground, but are more generalized for use by stock farm animals and are not particularly well adapted for use by horses. Horses are herd animals that instinctively rely on large numbers for safety. Horses are easily spooked and move quickly when startled by noise, smells, strong winds and even other dominant horses. Injuries to horses are often self-imposed when yielding to more dominant horses. When near feeders that have sharp edges or protrusions, horses often jump without looking and land hard on the edges or protrusions and receive corresponding injuries. Furthermore, horse can become entangled in conventional hay feeders when attempting to jump over the feeder to avoid being kicked or bitten by other more dominant horses.

Accordingly, it would be desirable to provide a device that could be utilized in the feeding of round bales of hay by depositing the round bale onto the surface of the ground that can minimize the aforementioned disadvantages typically associated with such feeding methods, including minimizing the opportunity for injury to the horses.

SUMMARY OF THE INVENTION

It is an object of this invention to overcome the aforementioned disadvantages of the prior art by providing a device for feeding round bales of hay designed for utilization specifically by horses.

It is an advantage of this invention that feeding costs for delivering forage crops, such as hay, to horse can be reduced.

It is another object of this invention to provide a round bale hay feeder that minimizes the loss of hay as a source of feed material to horses.

It is a feature of this invention that the round bale feeder ring does not have any sharp edges or protrusions exposed externally for impact by horses while eating hay therefrom.

It is another feature of this invention that the height of the feeder structure above the ground is designed to facilitate feeding therefrom by horses.

It is still another feature of this invention that the cylindrical body of the feeder ring provides convenient access to the round bale of hay by horses.

It is still another advantage of this invention that the feeder ring prevents horses from pulling hay out from the bottom of the round bale that results in waste of the hay.

It is yet another feature of this invention that the feeder ring requires the horses to feed from the top of the round bale of hay positioned within the feeder ring.

It is another feature of this invention that the feeder ring is formed from individual segments that can be easily assembled to provide a circular ring surrounding a round bale of hay.

It is still another object of this invention to provide a round bale ground feeder ring that can be manufactured from plastic through a rotational molding process.

It is a yet another feature of this invention that the individual ring segments are formed with overlapping regions to facilitate assembly into a feeder ring.

It is yet another advantage of this invention that the overlap regions are formed with alignable fastener openings to receive a suitable fastener for connecting the adjacent ring segments together through the overlap regions.

It is a further feature of this invention that each ring segment is formed with a ground engaging leg to position the body of the feeder ring above the surface of the ground when assembled and placed into use.

It is still another advantage of this invention that the individual ring segments are lightweight and easily manipulated and assembled to form the ground feeder ring around a round bale of hay placed in the field for feeding to horses.

It is yet another object of this invention to provide ground feeder ring for utilization with a round bale of hay for access by horses that is durable in construction, inexpensive of manufacture, carefree of maintenance, facile in assemblage, and simple and effective in use.

These and other objects, features and advantages are accomplished according to the instant invention by providing a ground feeder ring for use with round bales of hay positioned on the ground in the field for feeding to horses. The feeder ring is preferably assembled in the field around a previously positioned round hay bale and is formed from several individual ring segments that, when assembled, define a ring encircling the bale. Each ring segment is formed with corresponding overlap regions at the respective ends thereof with fastener openings formed therein to permit the connection of adjacent ring segments. The assembled ring prevents horses from accessing the bottom portion of the round bale that causes waste of the hay, thus reducing feeding costs. The ring segments can be manufactured from plastic formed during a rotational molding process to provide a durable double wall, lightweight device that can be easily transported and assembled in the field.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
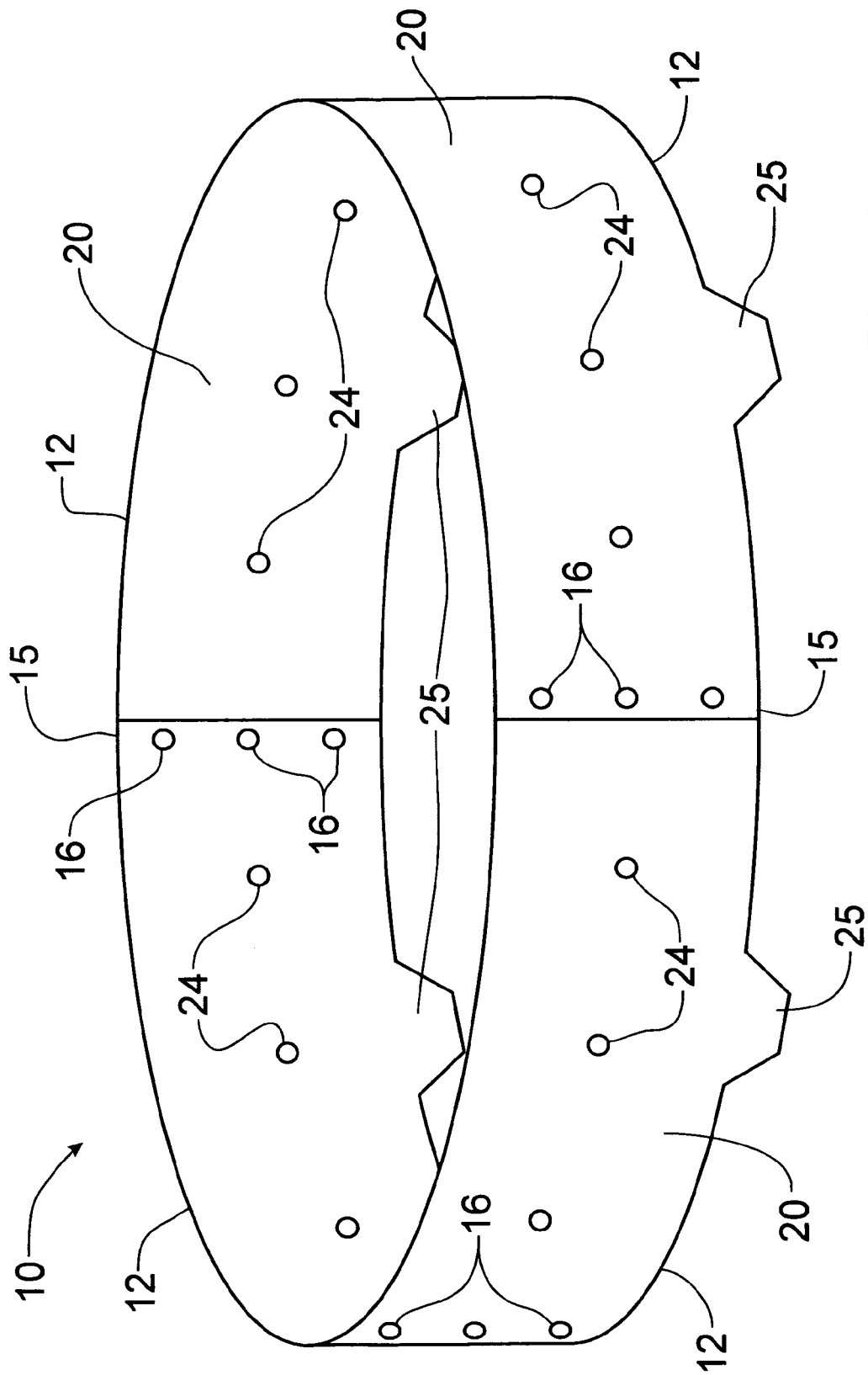
FIG. 1 is a perspective view of a ground feeding ring, incorporating the principles of the instant invention, for use in dispensing hay to horses.

Referring to the drawings, a ground feeder ring incorporating the principles of the instant invention can best be seen. The ground feeder ring 10 protects the bottom of a round bale of hay (not shown) and is positioned by either placing the round bale of hay into the center of the ground feeder ring 10 or by placing the ground feeder ring 10 over top of the round bale of hay. The purpose of the ground feeder ring 10 is to prevent the animals, particularly horses, from disturbing the lower portion of the round bale of hay to cause waste of the hay or to allow the horses to use the displaced hay as a bedding material.

The ground feeder ring 10 is formed by a plurality of ring segments 12 that are formed of plastic, preferably through a rotational molding process, and connected together at overlap regions 15 by fasteners 16 to form the intact, generally circular ground feeder ring 10. The formation of the ring segments 12 through rotational molding allows the plastic ring segments 12 to be easily formed in a durable double wall configuration to provide a lightweight, yet durable and cost effective ground feeder ring 10 when assembled. In the preferred embodiment, the ground feeder ring 10 is formed from four ring segments 12, each of which is formed identically, as will be described in greater detail below. Alternatively, the ground feeder ring 10 could be formed of a different number of segments, for example, six segments, so long as the ground feeder ring 10 includes at least three legs 25 to support the ring 10 in a stable manner on the ground, as will be described in greater detail below. In the way of a representative alternative configuration, a ground feeder ring 10 composed of six segments 12 could be formed of three segments having legs 25 and three segments without legs 25, alternating with the other segments with legs 25.

Figure 2:
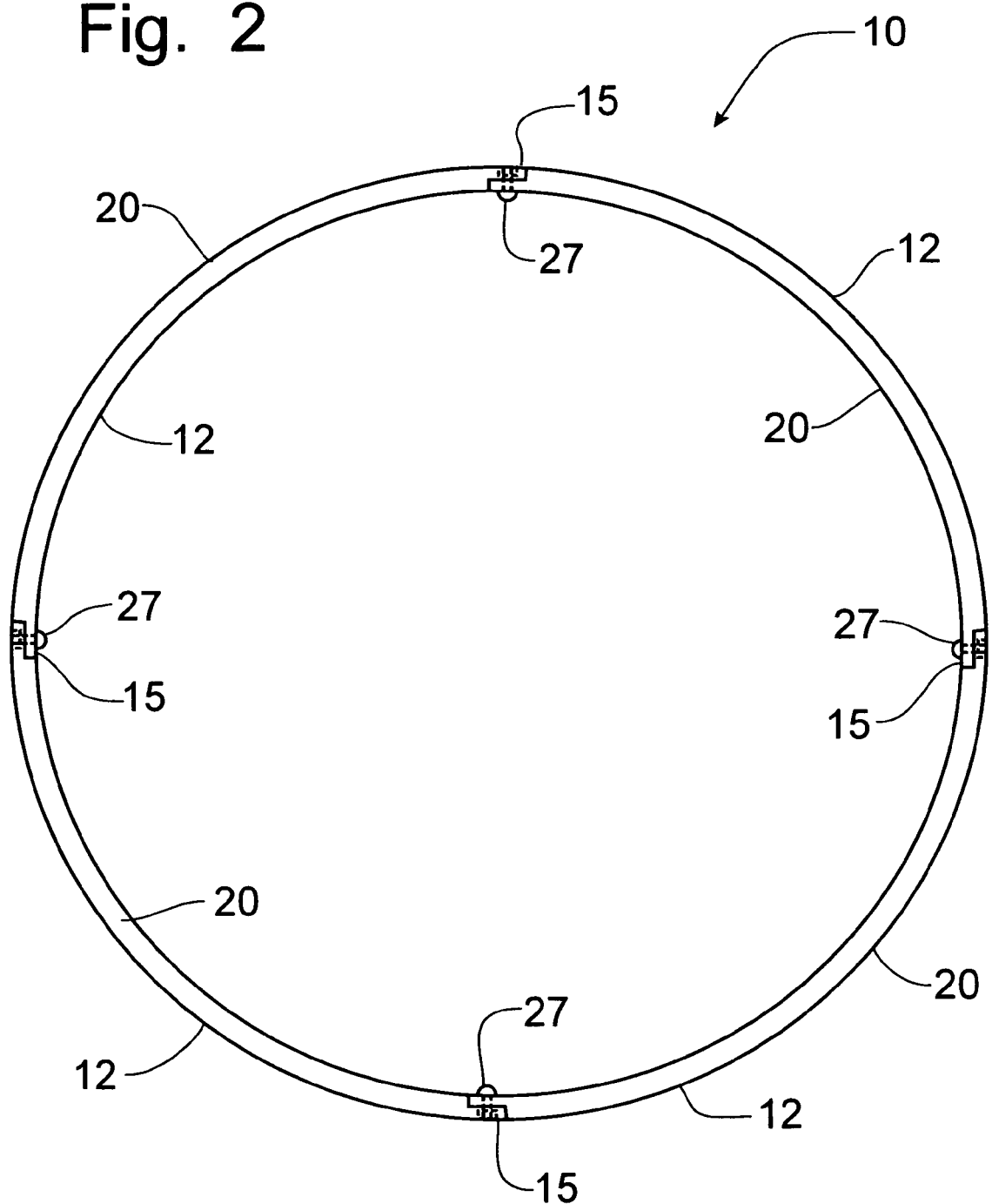
FIG. 2 is a top plan view of the ground feeding ring depicted in FIG. 1.
Figure 3:
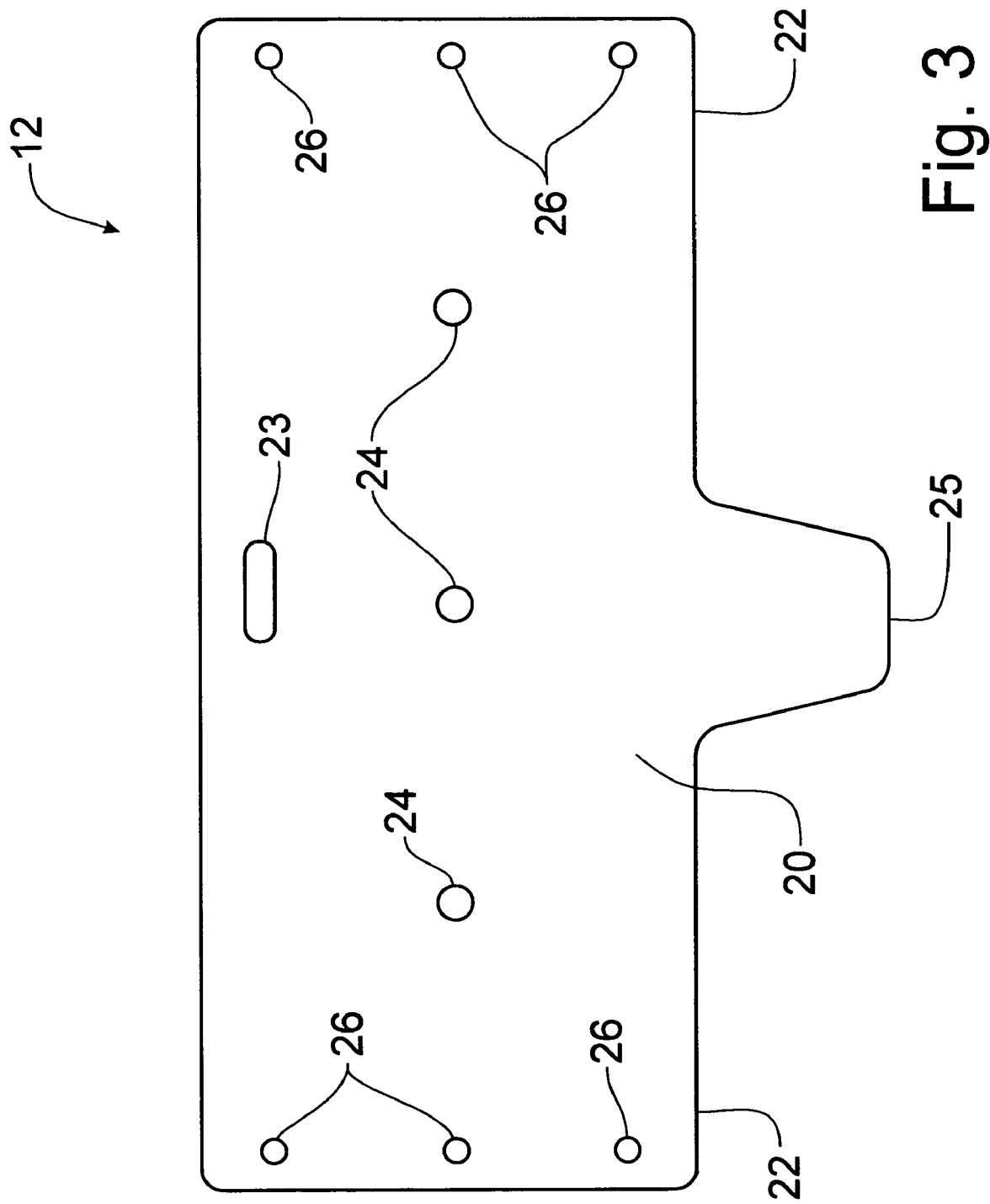
FIG. 3 is an elevational view of a ring segment forming part of the ground feeding ring shown in FIGS. 1 and 2.
Figure 4:
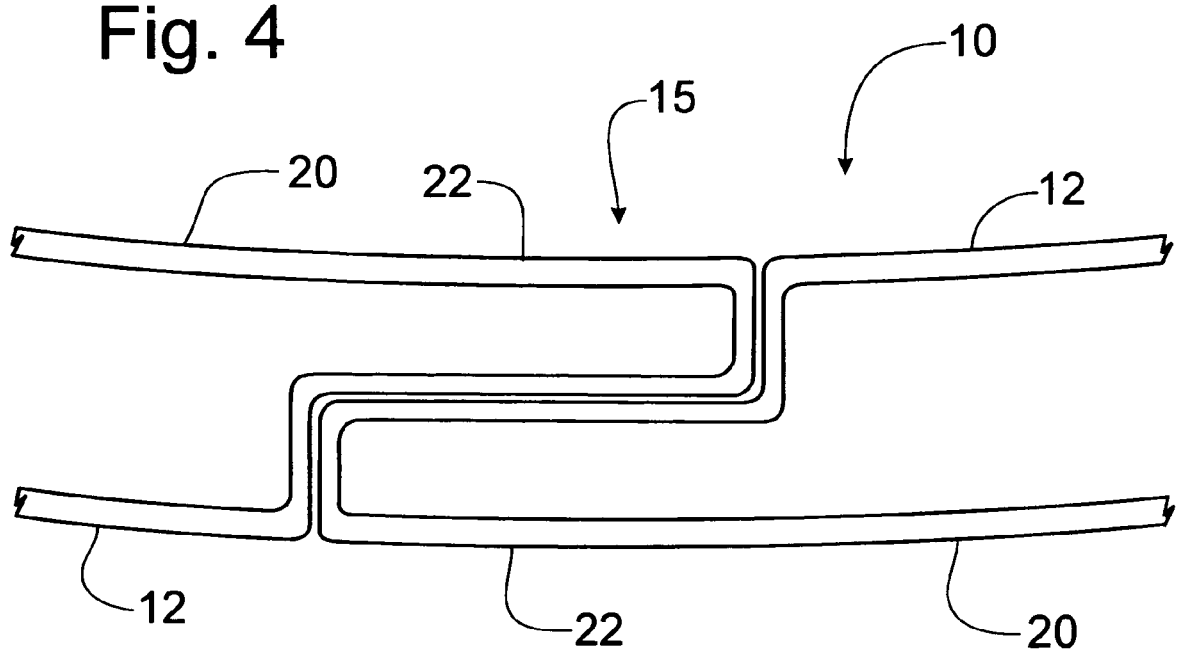
FIG. 4 is a cross-sectional detail view of the overlap region between adjacent ring segments looking between fastener openings.
Figure 5:
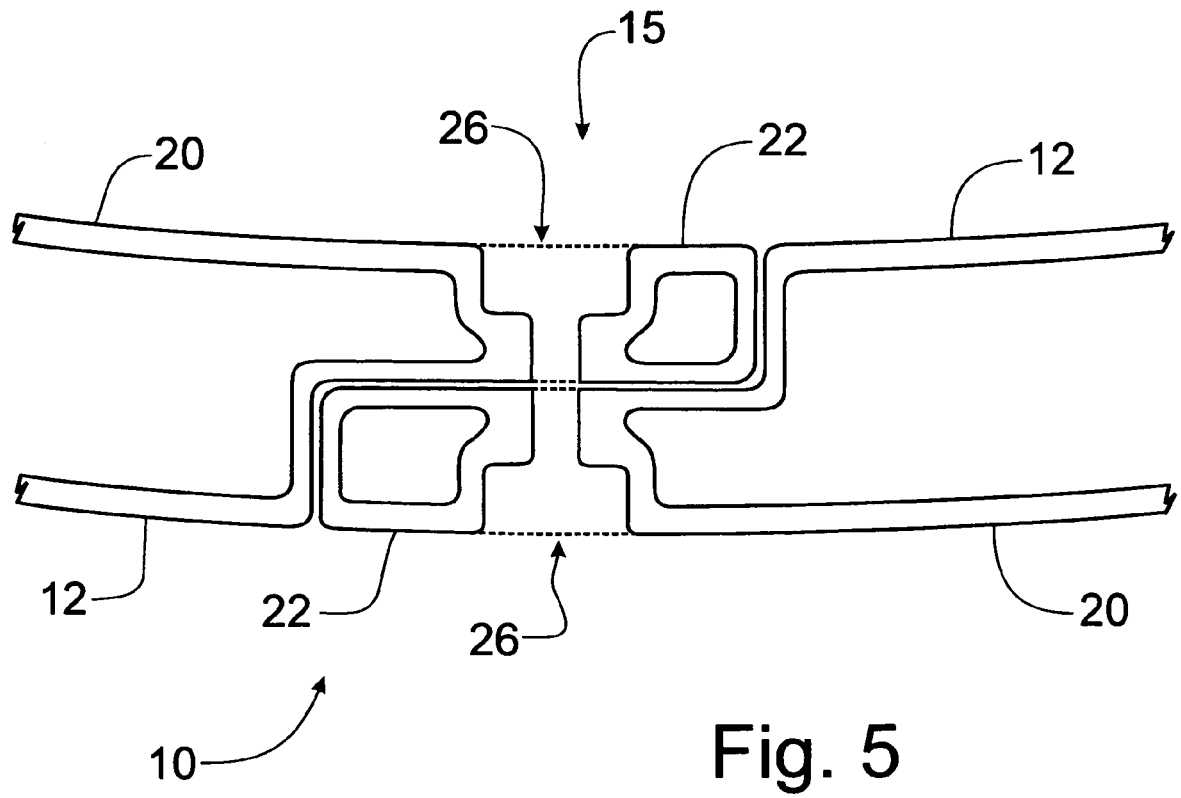
FIG. 5 is a cross-sectional detail view of the overlap region between adjacent ring segments looking through a fastener opening.

Referring specifically to FIGS. 1-3, the preferred embodiment is to provide four ring segments 12, each of which are formed identically. The rotational molded ring segments 12 have a hollow double wall construction, which is best seen in FIGS. 4 and 5, with a central body portion 20 that terminates in an overlap region 15 at each transverse end of the segment 12. The overlap region 15 is also best seen in FIGS. 4 and 5 and is formed by end portions 22 having a thickness of approximately half the body portion 20, while maintaining the double wall configuration, with the end portion 22 at one side of the ring segment 12 being configured to be positioned on the inside of the ground feeder ring 10 and the end portion 22 on the other side of the ring segments 12 being configured to be positioned on the outside of the ground feeder ring 10.

To maintain the integrity of the body portion 20, a plurality of kiss-offs 24 are spaced along the transverse centerline of the ring segment 12. A kiss-off 24 is formed during the rotational molding process by a plug (not shown) inserted into the mold (not shown) to allow the plastic material to form around the plug and interconnect the opposing inside and outside walls of the body portion 20, thus allowing the body portion 20 to maintain wall spacing and structural and operational integrity. Typically, a kiss-off 24 creates an opening extending through the body portion 20. Similarly, each ring segment 12 is formed with a handle opening 23 near the top of the body portion 20 in substantially the same way as the kiss-offs 24 to facilitate the handling of the ring segment 12.

Each ring segment 12 of the preferred embodiment is formed with a ground support leg 25 at the center of the body portion 20 to project downwardly from the body portion 20. Like the body portion 20, the ground support leg 25 is formed in the double wall configuration. The purpose of the ground support leg 25 is to keep the ground feeder ring 12 elevated slightly about the surface of the ground. As noted above, the ground feeder ring 10 needs to have at least three ground support legs 25 for stability. With the four-segment configuration of the preferred embodiment, the ground feeder ring 10 will have four ground support legs 25 and adequate stability.

Referring now to FIGS. 4 and 5, the overlap region 15 of the ring segments 12 can best be seen. FIG. 5 depicts a cross-sectional detail through the fastener opening 26, with the fastener 16 being removed for purposes of clarity, while FIG. 4 shows the cross-sectional detail through the overlap region 15 between the fastener openings 26. Each opposing end portion 22 is configured to overlap with the adjoining end portion 22 of the adjacent ring segment 12, with one end portion 22 being configured to be on the inside of the assembled ground feeder ring 10 and the adjoining end portion 22 being on the outside of the assembled ground feeder ring 10. Preferably, the overlapping end portions 22 are connected through a plurality of fastener openings 26, with three openings 26 being preferred. As with the kiss-offs 24, the fastener openings 26 are formed with a plug insert into the end portion 22 during the molding process so that the fastener opening 26 is surrounded by plastic material.

The construction of the ring segments 12 from rotational molded plastic presents a very lightweight component. Assembly of the ring segments 12 by the insertion of fasteners 16 through overlapping end portions 22 creates the assembled ground feeder ring 10, as seen in FIG. 1. The overall weight of the assembled ground feeder ring 10 is such that a single person can lift the ring 10 overtop of a round bale of hay lying of the surface of the ground, oriented with the generally planar ends of the cylindrical round bale being on the ground and the cylindrical circumference forming a generally vertical surface of the round bale. Orienting the ground feeder ring 10 with the ground support legs 25 on the surface of the ground positions the body portions 20 of the ring segments 12 slightly above the surface of the ground. The curvature of the ring segments 12 permits the inside diameter of the assembled ground feeder ring 10 to receive a standard round bale diameter, while the body portions 20 of the ring segments 12 encircle the lower part of the circumference of the round bale of hay.

The positioning of the ground feeder ring 10 over the round bale of hay prevents horses from pulling hay out from the bottom of the bale to cause waste thereof. The scattered loose hay around the bottom of the bale encourages horses to bed in this loose hay causing yet further waste of the hay. The placement of the ground feeder ring 10 prevents the horses from accessing this part of the round bale except from over the top edge of the ring 10 when the bale is consumed to that point. Accordingly, the use of the ground feeder ring 10 prevents a significant amount of waste from the round bale of hay when fed to horses, or other animals, directly on the ground.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A ground feeder ring for utilization with a round bale of forage crop for feeding the forage crop to animals in the field, comprising:
    at least three ring segments, each segment having a body portion having a vertical height dimension and being formed from plastic in a hollow, double wall configuration in which said body portion is formed with horizontally opposed inner and outer walls extending said height dimension of said body portion with a curvature such that said ring segments when assembled form a circular enclosure capable of surrounding said round bale of forage crop; and
    each said segment being formed in a double wall configuration with inner and outer horizontally spaced walls connecting with top and bottom walls to enclose a hollow space therebetween and having an overlap region along opposing lateral ends thereof, corresponding overlap regions having a thickness approximately half of a corresponding thickness of said body portion so that the joinder of mating overlapping regions of adjacent ring segments results in a substantially uniform thickness of said assembled ground feeder ring, each said ring segment being devoid of openings through which said animals can access forage crop, said vertical height dimension locating an upper edge of said ring segment such that only a lower portion of said round bale of forage crop is covered by said ground feeder ring so that said animals can only access said round bale of forage crop by reaching over said body portion, said overlap region extending fully along said vertical height and incorporating at least one fastener opening therethrough for the passage of a corresponding fastener, each said fastener opening being formed with plastic material surrounding each said fastener opening to recess said fastener within said body portion.

2. The ground feeder ring of claim 1 wherein each said ring segment is also formed with a ground engaging leg operable to support said body portion above the surface of the ground when said ring segments are assembled into said ground feeder ring, said ground engaging leg having a lateral width smaller than a corresponding lateral width of said body portion extending between said lateral ends.

3. The ground feeder ring of claim 1 wherein said ring segments number at least six, half of said ring segments being formed with a ground engaging leg operable to support said body portion above the surface of the ground when said ring segments are assembled into said ground feeder ring.

4. A ground feeder ring formed from a plurality of ring segments, each said ring segment comprising:
    a body portion having a height dimension and being formed from plastic in a hollow double wall configuration defining an inner wall and a horizontally opposing outer wall connecting with top and bottom walls to enclose a hollow space therebetween and extending said height dimension, said body portion having a first thickness corresponding to the distance between said inner and outer walls, said body portion terminating in spaced-apart lateral ends;
    an overlap portion at each lateral end of said body portion, the opposing said overlap portions on each said ring segment being formed in an opposing, mating configuration, said overlap portion having a second thickness substantially equal to about half of said first thickness so that joined mating overlap portions of adjacent ring segments having a uniform thickness compared to said body portion, each said overlap portion having at least one opening therethrough with openings of mating overlap portions being alignable;
    a ground engaging leg formed on each said ring segment and projecting downwardly from and parallel to said body portion when vertically oriented to support said body portion above the ground, said ground engaging leg having a lateral width smaller than a corresponding lateral width of said body portion extending between said lateral ends and a vertical height that elevates said body portion above the ground such that only said ground engaging legs are contacting the ground; and
    a fastener extending through said aligned openings in mating overlap portions to connect adjacent ring segments to one another.

5. The ground feeder ring of claim 4 wherein each said ring segment further comprises a grip opening vertically opposing said ground engaging leg to facilitate the handling of said ring segment.

6. The ground feeder ring of claim 4 wherein said openings formed in said overlap portions allow said fasteners to be recessed into said body portion.

7. The ground feeder ring of claim 4 wherein said joined ring segments form a circular device capable of surrounding a round bale of forage crop for feeding to horses.

8. The ground feeder ring of claim 7 wherein said circular device covers a lower portion of said round bale of forage crop, thereby requiring said horses to reach over said body portion to access said round bale.

9. The ground feeder ring of claim 8 wherein said ring segments are formed during a rotational molding process.

10. A method of feeding a round bale of forage crop to animals comprising the steps of:
    placing said round bale of forage crop on the ground;
    assembling a plurality of ring segments into a circular ground feeder ring for surrounding a lower portion of said round bale of forage crop, each said ring segment including a body portion having a vertical height in a double wall configuration with inner and outer horizontally spaced walls connecting with top and bottom walls to enclose a hollow space therebetween and extending along said vertical height, said body portion being devoid of openings that would permit said animals to access said round bale of forage crop through said body portion, each said ring segment being formed with a ground engaging leg extending downwardly from and parallel to said body portion when said body portion is vertically oriented, said ground engaging leg having a horizontal dimension smaller than a corresponding horizontal dimension of said body portion, including the steps of:
  overlapping connecting regions extending along the full vertical height of said body portions at the lateral ends of said ring segments in a mating orientation, said overlapping connecting regions having aligned openings extending therethrough;
  inserting fasteners through said aligned openings and connecting said adjacent ring segments together; and
  repeating said overlapping and inserting steps until said circular ground feeder ring is formed; and
positioning said ground feeder ring around said round bale of forage crop to block said lower portion of said round bale from access by said animals; and
orienting said ground feeder ring with said legs against the ground to elevate said body portion above the ground.

11. The method of claim 10 wherein said assembling step further includes the step of:
  locating said ring segments around said round bale of forage crop so that said ground feeder ring is positioned around said round bale upon the completion of said assembling step.

12. The method of claim 10 wherein said assembling step is completed prior to said placing and said positioning step.

13. The method of claim 12 wherein said assembling step is performed remotely of said round bale and said ground feeder ring is transported intact to said round bale for said positioning step.

* * * * *